(12) United States Patent
Long et al.

(10) Patent No.: US 6,745,977 B1
(45) Date of Patent: Jun. 8, 2004

(54) FLYING CAR

(76) Inventors: Larry D. Long, 215 S. Fulton St., Avon, IL (US) 61415; Terry L. Sturgeon, 5341 Summit, Bartonville, IL (US) 61607

( * ) Notice: Subject to any disclaimer, the term of this patent is extended or adjusted under 35 U.S.C. 154(b) by 0 days.

(21) Appl. No.: 10/644,636

(22) Filed: Aug. 21, 2003

(51) Int. Cl.[7] ............................................. B64C 37/02
(52) U.S. Cl. ..................... 244/2; 244/17.25; 244/23 B; 244/221
(58) Field of Search .................. 244/2, 17.17, 17.23, 244/17.25, 23 A, 23 B, 221, 234

(56) References Cited

U.S. PATENT DOCUMENTS

| | | | |
|---|---|---|---|
| 3,503,573 A | 3/1970 | Modesti | |
| 3,946,970 A | 3/1976 | Blankenship | |
| 4,457,476 A | 7/1984 | Andresevitz | |
| 4,955,962 A | 9/1990 | Mell | |
| 5,069,649 A | 12/1991 | Wu | |
| 5,141,173 A | * 8/1992 | Lay | 244/2 |
| 5,232,391 A | 8/1993 | Vaughns et al. | |
| 5,360,367 A | 11/1994 | Ho | |
| 5,505,407 A | * 4/1996 | Chiappetta | 244/2 |
| 5,890,441 A | * 4/1999 | Swinson et al. | 244/12.3 |
| 6,517,026 B1 | * 2/2003 | Smith | 244/2 |

* cited by examiner

*Primary Examiner*—J. Woodrow Eldred
(74) *Attorney, Agent, or Firm*—Donald R. Schoonover

(57) ABSTRACT

A vehicle is in the general shape of a land vehicle, such as a car, but has a plurality of rotors so the vehicle is capable of flight in the manner of a VTOL or a helicopter. The vehicle has foot pedals and steering that can be operated in the manner similar to that of a car.

1 Claim, 6 Drawing Sheets

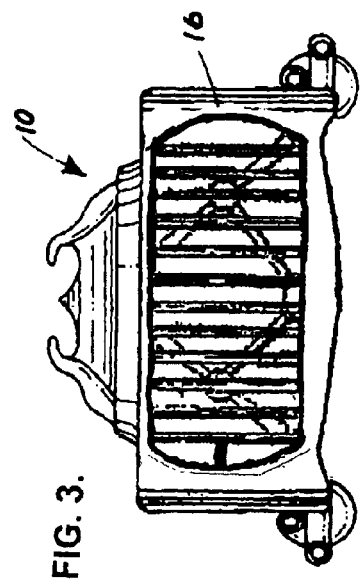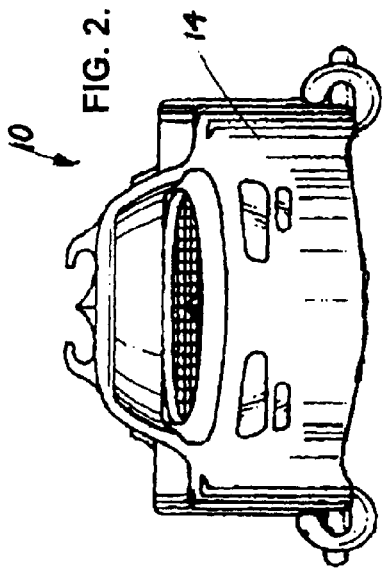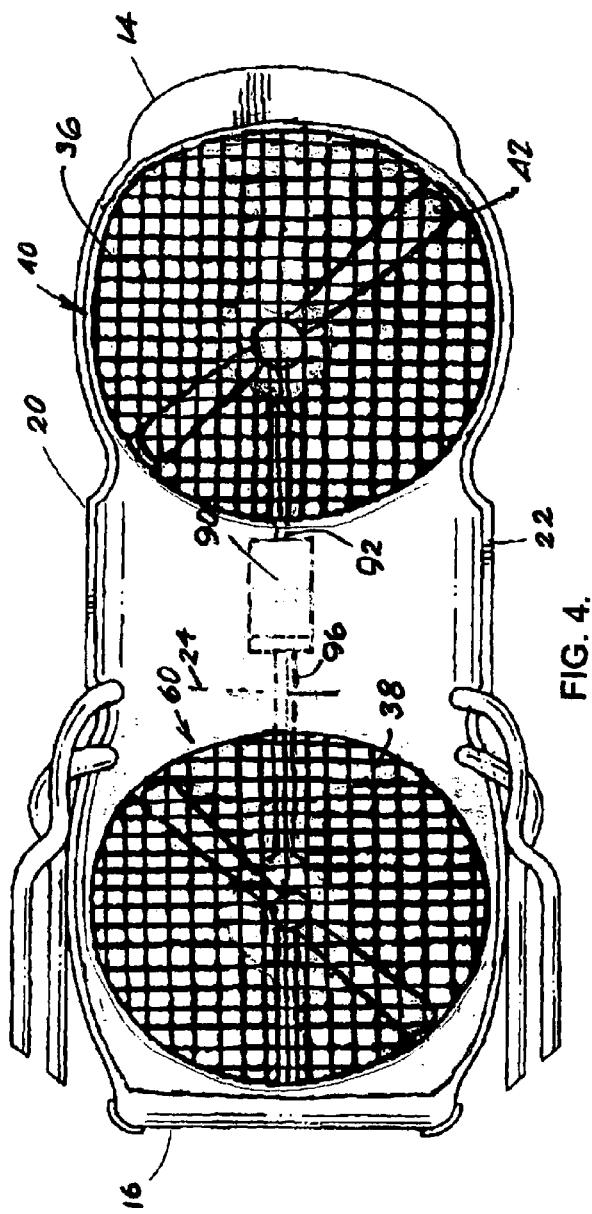

FLYING CAR

BACKGROUND OF THE INVENTION

1. Field of the Invention

The present invention relates to the general art of motor vehicles, and to the particular field of flying vehicles.

2. Discussion of the Related Art

As anyone who has driven on roadways near any major city in the world will attest, people of today are very mobile and the number of land vehicles on the roads, both major roads and secondary roads, is increasing at nearly alarming rates. Roads are becoming more and more congested with each passing day. The roadways are shared by commuters, police and fire departments, rescue squads, as well as the military. This adds still further to the congestion on the roadways. The congestion is not only frustrating to those trapped in it, it is wasteful of time and energy.

Therefore, there is a need for a mode of personal transportation that will bypass the congestion on roadways.

In order to be most efficient, any mode of personal transportation should be as agile as possible and as maneuverable as possible. This will permit the user to move into all of the areas now accessed by automobiles and also to maneuver near congested areas as well.

Many land vehicles that are used by civilians can also be very useful to the military as well as civilian defense. For this reason, these vehicles also should be as agile and as maneuverable as well.

Therefore, there is a need for a highly maneuverable and agile transportation vehicle.

One alternative to land vehicle transportation is air vehicle transportation. This form of transportation has, historically, included airplanes as well as helicopters. While this form of transportation has been fairly efficient, it generally requires a user to depart and arrive at specific locations that are designed to accommodate aircraft. These areas vary from airports to special landing pads. This requirement may add to vehicular congestion as people travel to and from the designated landing and takeoff areas, generally by land vehicle. Often this type of transportation is very expensive in addition to being somewhat inconvenient in both time and logistics.

Therefore, there is a need for a highly maneuverable and agile transportation vehicle that is capable of flight.

As with any product that is marketed to the public, the easier such a vehicle is to operate, the more successful it will be. One problem with many flying vehicles, such as helicopters or the like, is that they are difficult and complicated to operate. Thus, the public will be slow to accept such vehicles.

Therefore, there is a need for a highly maneuverable and agile transportation vehicle that is capable of flight and is easy to operate.

As mentioned above, not only are those in the public interested in alternative modes of transportation, those in the military and civil defense, as well as those in the rescue and fire industries, are also interested in avoiding the congested roadways that they now have to use.

Therefore, there is a need for a vehicle that can be used not only by the public for general transportation but also by the military as well as the civil defense and rescue industries to meet their needs as well.

PRINCIPAL OBJECTS OF THE INVENTION

It is a main object of the present invention to provide a highly maneuverable and agile transportation vehicle.

It is another object of the present invention to provide a highly maneuverable and agile transportation vehicle which is capable of flight.

It is another object of the present invention to provide a highly maneuverable and agile transportation vehicle and which is extremely versatile.

It is another object of the present invention to provide a highly maneuverable and agile transportation vehicle and which is extremely versatile and which is easy to operate.

SUMMARY OF THE INVENTION

These, and other, objects are achieved by a personal vehicle that has a general appearance of a land vehicle but which is driven by rotors in the manner of a helicopter so the vehicle will fly. The vehicle has two horizontally oriented rotors as well as a vertically oriented rotor and is controlled by a compound steering wheel. The vehicle also includes brakes and the like that resemble the equipment associated with cars so a driver can operate the flying vehicle in the manner of a car with which he or she is familiar.

The vehicle can thus be operated in the manner of a car, but will have flight capability in the manner of a Vertical Take-Off and Landing (VTOL) vehicle, and thus will be useful in avoiding and relieving congestion on the roadways. The vehicle is designed to be easy to operate so it will be attractive to the general public. The vehicle will be as agile and as maneuverable as a small helicopter so the vehicle can be maneuvered and operated in congested areas while still being safe. The vehicle will not be subject to the congestion associated with land vehicles and thus will provide significant advantages to an operator. Since the vehicle is agile and maneuverable, it will be attractive to the military as well as to others such as police, fire, rescue and civil defense personnel.

The vehicle can also be used by the airline industry as a shuttle between airports, or even between locations in a single airport. This will relieve much pressure on present airline traffic routes as well as providing an important new product for both the airline manufacturers and the land vehicle manufacturers.

BRIEF DESCRIPTION OF THE DRAWING FIGURES

FIG. 2 is a front elevational view thereof.

FIG. 3 is a rear elevational view thereof.

FIG. 4 is a bottom view thereof.

DETAILED DESCRIPTION OF THE PREFERRED EMBODIMENT

Figure 1:
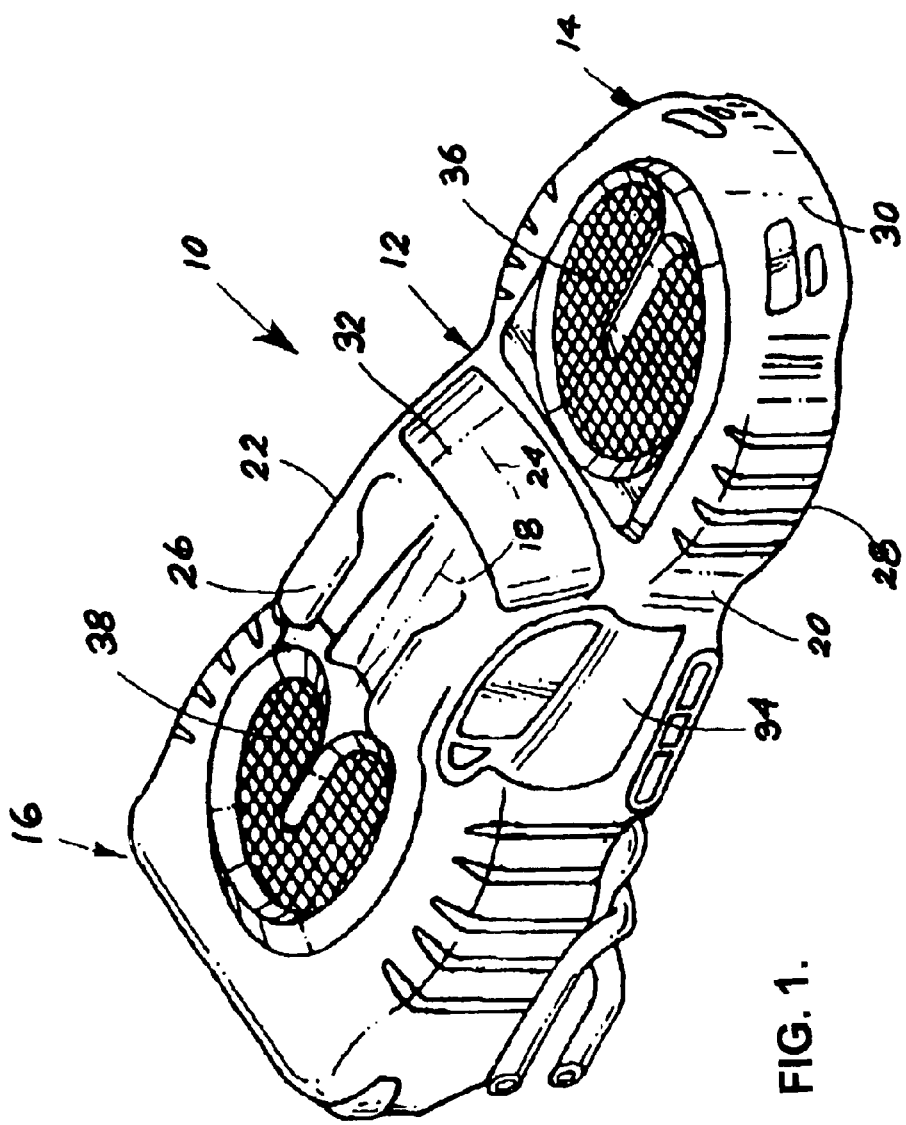
FIG. 1 is a front and top perspective view of a vehicle embodying the present invention.

Other objects, features and advantages of the invention will become apparent from a consideration of the following detailed description and the accompanying drawings.

Referring to the figures, it can be understood that the present invention is embodied in a motor vehicle 10 that operates in the manner of a VTOL type aircraft but is sized and designed to be a personal vehicle. Motor vehicle 10 comprises a main body 12 that is in the shape of a land vehicle car and which has a front end 14, a rear end 16 and a longitudinal axis 18 which extends between the front end 14 and the rear end 16. The main body 12 further includes a first side 20, a second side 22, and a transverse axis 24 which extends between the first side 20 and the second side 22. The main body 12 further includes a top 26, a bottom 28, and a height dimension 30 which extends between the top 26 and the bottom 28. A windshield 32 and doors 34 can also be included so the vehicle 10 further resembles a car. A front vent area 36 and a rear vent area 38 are also defined in the main body 12.

Figure 5:
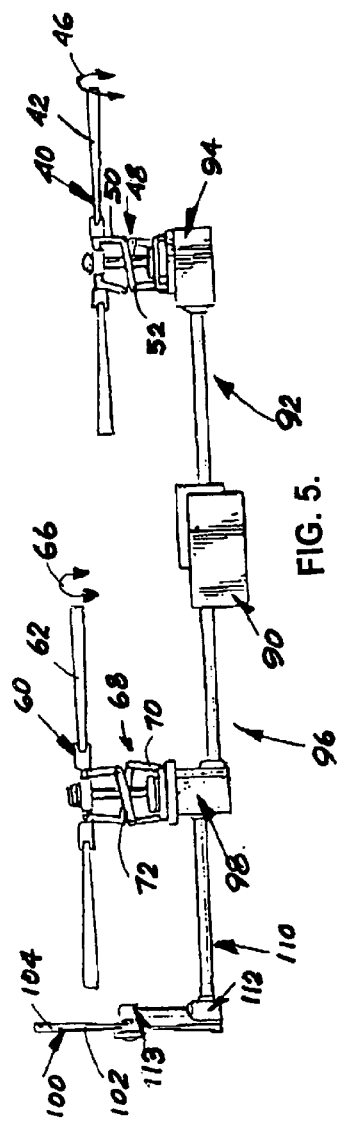
FIG. 5 shows the rotors of the vehicle embodying the present invention.

A front rotor 40 is mounted on the main body 12 near the front end 14 of the main body 12 and is oriented to rotate in a horizontal plane to produce lift to the vehicle 10. The front rotor 40 includes at least one rotor blade 42 that includes a longitudinal axis 44 and which is mounted to move in a roll motion, indicated by double-headed arrow 46 in FIG. 5, about the longitudinal axis 44 of the rotor blade 42 of the front rotor 40. Rotor blade 42 is moved by collective sleeve swash plate and scissor assembly 48 which includes lever arms, such as lever arm 50, pivots, such as pivot 52 and collective control tubes 54.

A rear rotor 60 is mounted on the main body 12 near the rear end 16 of the main body 12 and oriented to rotate in a horizontal plane to produce lift to the vehicle 10. The rear rotor 60 includes at least one rotor blade 62 that includes a longitudinal axis 64. Rotor blade 62 is mounted to move in a roll motion about the longitudinal axis 64 of the rotor blade 62 of the rear rotor 60 as indicated by the double-headed arrow 66 shown in FIG. 5. Rotor blade 62 is moved by mechanism 68 which includes lever arms, such as lever arm 70 and pivots, such as pivot 72.

The front rotor 40 is set lower than the rear rotor 60 to provide greater viewing area for the driver of the vehicle 10.

A power plant 90 is mounted on the main body 12 between the front end 14 of the main body 12 and the rear end 16 of the main body 12. The power plant 90 can be an internal combustion engine or any other engine suitable for vehicle 10. The power plant 90 is set to the lowest possible position to provide for a low center of gravity and to maintain a stabilized aerodynamic integrity. The power plant 90 is connected to the rotors by drive shafts, such as drive shaft 91 and gear systems such as gear system 91' to transfer power from the power plant 90 to the rotors 40, 60.

A front rotor connection system 92 couples the power plant 90 to the front rotor 40 and includes a suitable gear mechanism 94 to translate motion associated with the power plant 90 into motion suitable for use by the front rotor 40.

A rear rotor connection system 96 couples the power plant 90 to the rear rotor 60 and includes a suitable gear mechanism 98 to translate motion associated with the power plant 90 into motion suitable for use by the rear rotor 60. The rear rotor connection system 96 is similar to the just-described connection system 92 associated with the front rotor 40 and includes a drive shaft and appropriate gearing to transfer motion of the drive shaft to the rear rotor 60.

Figure 6:
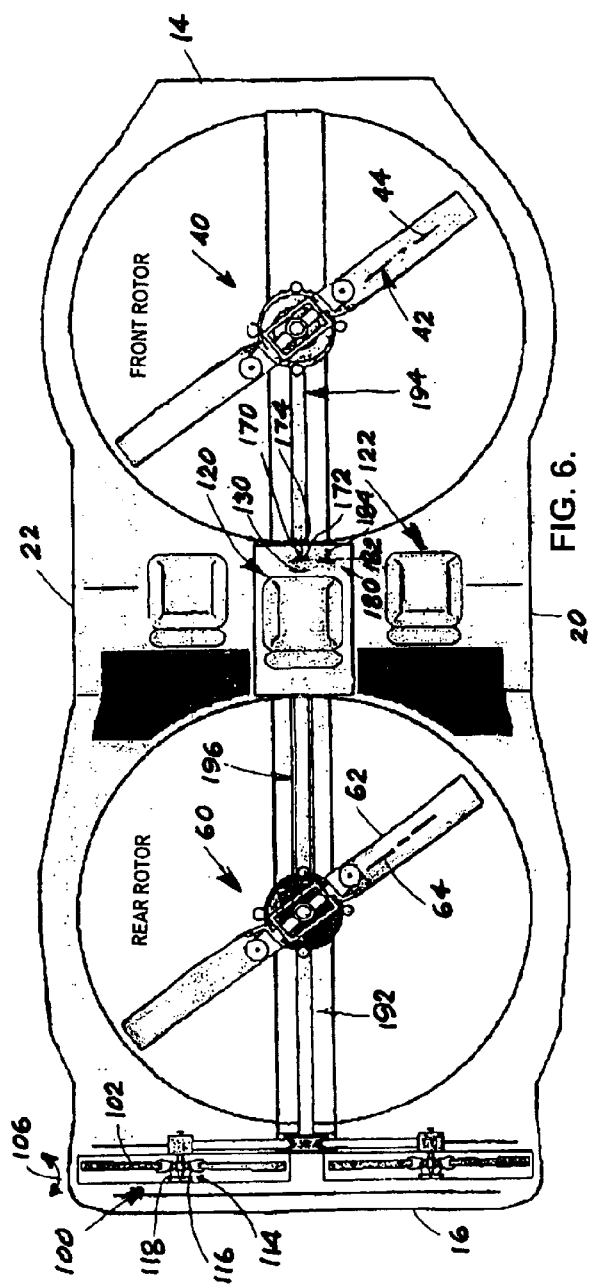
FIG. 6 shows the rotors in place on the vehicle.

A tail rotor 100 is mounted on the rear end 16 of the main body 12 and is oriented to rotate in a vertical plane and provides thrust propulsion to the main body 12 in the direction of the longitudinal axis 18 of the main body 12. The tail rotor 100 has at least one rotor blade 102 that includes a longitudinal axis 104. Rotor blade 102 is mounted to rotate in a roll direction about the longitudinal axis 104 of the rotor blade 102 of the tail rotor 100 as indicated by double-headed arrow 106 in FIG. 6 to have a positive pitch, a negative pitch and a neutral pitch.

A tail rotor connection system 110 couples the tail rotor 100 to the power plant 90 and includes suitable gear mechanisms 112 and 113 to translate motion associated with the power plant 90 into motion suitable for use by the tail rotor 100. Rotor blade 102 is moved by mechanism 114 which includes lever arms, such as lever arm 116 and pivots, such as pivot 118. The tail rotor connection system 110 is similar to the just-described connection system associated with the front rotor 40 and includes a drive shaft and appropriate gearing to transfer motion of the drive shaft to the tail rotor 100.

A driver's seat 120 is mounted on the main body 12 between the front rotor 40 and the rear rotor 60. A passenger seat 122 is mounted on the main body 12 adjacent to the driver's seat 120. Further passenger seats can be included as desired.

Figure 9:
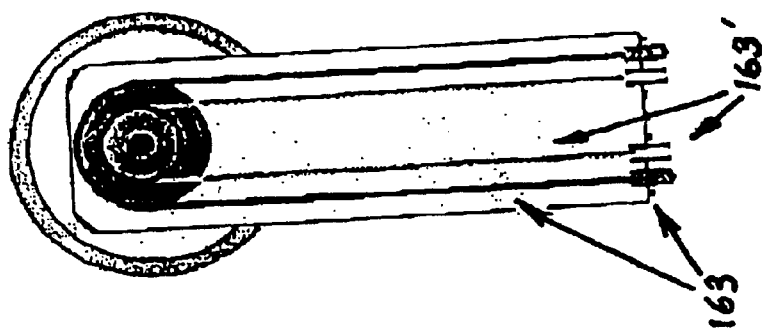
FIG. 9 is a front elevational view of the steering wheel.
Figure 8:
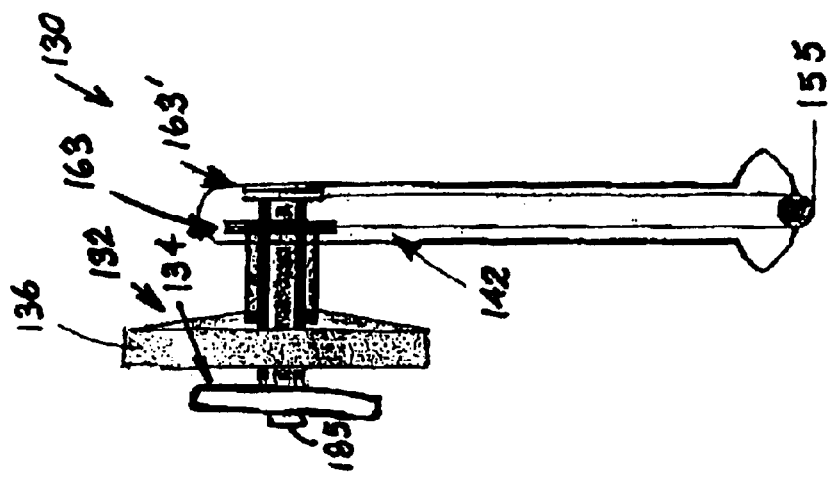
FIG. 8 is a side elevational view of a compound steering wheel used in the vehicle embodying the present invention.
Figure 10:
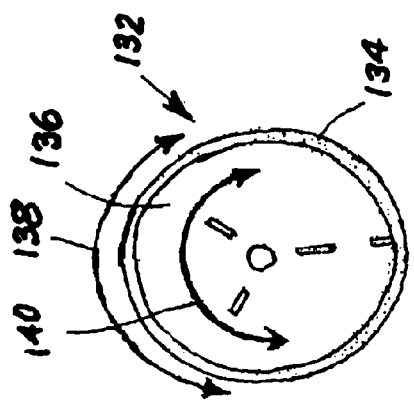
FIG. 10 is a schematic of the steering wheel.
Figure 12:
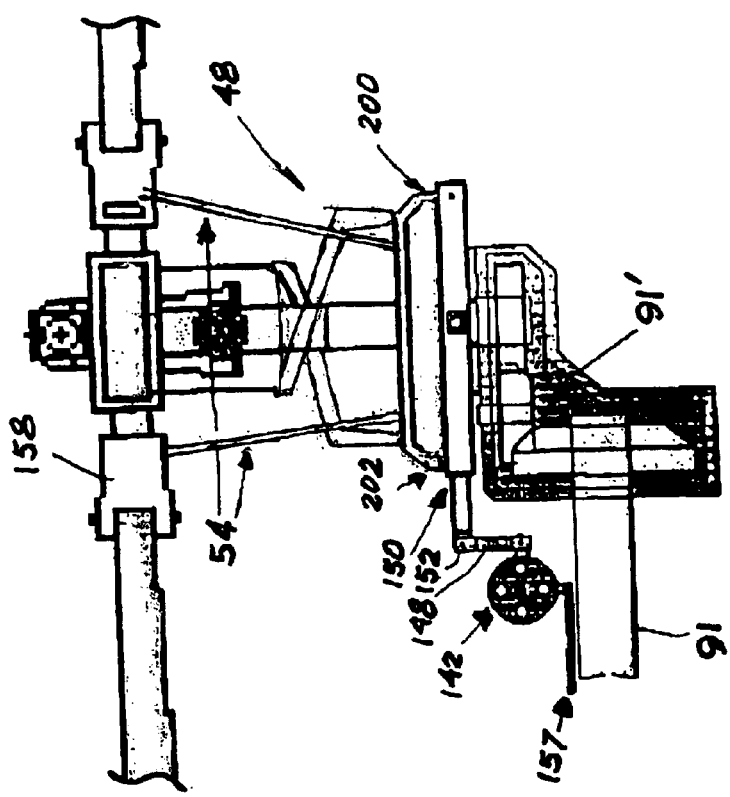
FIG. 12 shows a connection to one of the rotors of the vehicle.

A steering mechanism 130 is mounted on the main body 12 and is shown in FIGS. 8, 9 and 10. The steering mechanism 130 includes a compound steering wheel 132 which is mounted on the main body 12 adjacent to the driver's seat 120. The compound steering wheel 132 includes an outer steering wheel 134 and an inner steering wheel 136. The outer steering wheel 134 and the inner steering wheel 136 are rotatable in directions indicated by double-headed arrows 138 and 140.

A steering connection 142, which can include levers 148 and 150 connected together by a pivot 152 and includes a portion 142' which connects the outer steering wheel 134 to the front rotor 40 and a portion 142" which connects the inner steering wheel 136 to the rear rotor 60.

Figure 11:
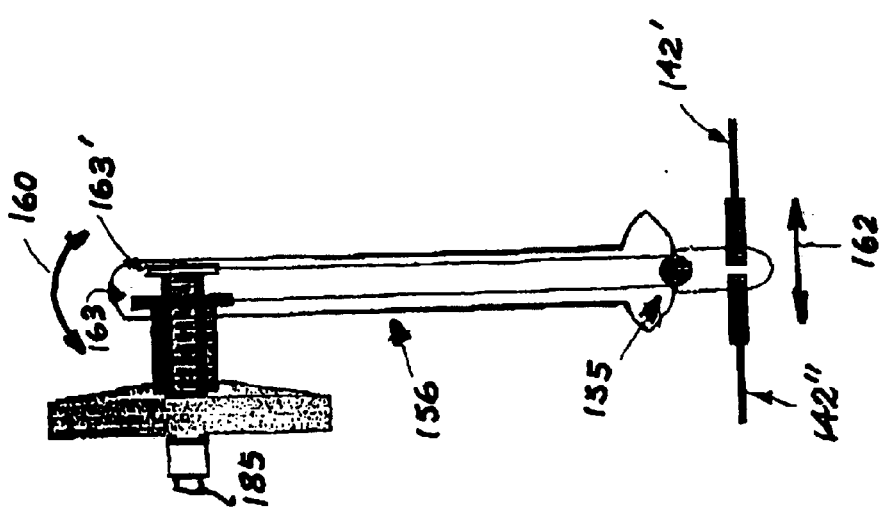
FIG. 11 is a side elevational view of the steering wheel illustrating one method of controlling the vehicle using the steering wheel.

The steering wheel 132 is movably mounted on the main body 12 by a pivot 155 to be movable in the direction of the longitudinal axis 18 of the main body 12 between a forward orientation and a rearward orientation as indicated by the double-headed arrows 160 and 162 in FIG. 11.

When steering column 156 is pulled toward the driver or pilot, this action pushes collective control 157 activating pivot cam 154 upwardly forcing the collective control lever 150 to apply positive pitch to blade grips 158 causing lift. The control rods are connected to a swash plate and the swash plate is connected to the collective sleeve assembly 48. When the steering column 156 is pushed away from the pilot, this action pulls the collective controls 157 and reverses the process and decreases the applied pitch back to a neutral pitch. This action reduces lift causing the craft to lower its altitude.

The outer steering wheel 134 controls the cyclic articulation of the front main rotor system. If the wheel 134 is turned clockwise, this activates a cable and pulley system 163 that connects to a swash plate and scissor assembly causing the rotor blades to tilt to the right. If the steering wheel 134 is turned counter-clockwise, then the rotor blades are tilted to the left. Tilting the rotor blades to the right or left causes the thrust vector to shift to the opposite direction providing thrust to turn the vehicle 10 in the direction of steering. The inner steering wheel 136 controls the cyclic articulation of the rear main rotor system using a cable and pulley system 163'. This control is the same as is utilized for the outer steering wheel 134, only providing right and left tilt to the blades 62 of the rear rotor 60.

The separation of the cyclic articulation of the front and rear rotor systems allows for precision turning. The vehicle may turn utilizing the front rotor 40 causing the nose of the vehicle 10 to lead in the direction of steering. The vehicle may turn utilizing the rear rotor 60, causing the tail end of the vehicle 10 to swing in the direction of steering which, in effect, causes the nose to turn in the opposite direction of steering. Turning both wheels 134, 136 in the same direction causes the craft 10 to strafe sideways in the direction of steering. Turning both wheels 134, 136 in opposite directions causes the vehicle 10 to spin at the central fulcrum of the front and rear rotors 40, 60 allowing for 180° turns in place. This provide agility and maneuverability to the vehicle 10.

A brake mechanism 170 is mounted on the main body 12 in front of the driver's seat 120. The brake mechanism 170 includes a brake pedal 172 located in front of the driver's seat 120 and a brake connection 174 connecting the brake pedal 172 to the rotor blade 102 of the tail rotor 100 to move the rotor blade 102 of the tail rotor 100 in accordance with the position of the brake pedal 172 between a positive pitch position, a negative pitch position, and a neutral pitch position of the rotor blade 102 of the tail rotor 100.

An accelerator mechanism 180 is mounted on the main body 12 and includes an accelerator pedal 182 mounted on the main body 12 adjacent to the driver's seat 120 and an accelerator mechanism 184 connecting the accelerator pedal 182 to the rotor blade 102 of the tail rotor 100 to vary the pitch of the rotor blade 102 of the tail rotor 100 between a positive pitch, a negative pitch, and a neutral pitch in accordance with the position of the accelerator pedal 182 and to vary the power supplied to the tail rotor 100 in accordance with the position of the accelerator pedal 182. An adjustable throttle 185 controls the power plant 90 to maintain a constant RPM and power ratio in order to maintain flight or lift. If more power is needed, the throttle 185 is adjusted to increase the power output independently of the accelerator pedal 182. The accelerator pedal 182 is also connected to the front rotor 40 via a mechanism 194 and to the rear rotor 60 via a mechanism 196.

When the accelerator pedal is depressed, a tail rotor sprocket and a forward control sprocket 200 are actuated. This adds collective pitch to the tail rotor blades 102 causing forward thrust and causes the main rotors 40, 60 to tilt forward causing forward thrust to push the vehicle 10 forward. When the brake pedal 172 is depressed, this reverses the action to neutral and if pressed further causes negative collective pitch to be applied to the tail rotor 100 and causes a reverse control sprocket 202 on the main rotors 40, 60 to tilt the rotors backwards causing reverse thrust thus slowing the vehicle 10 and then flying in reverse.

Figure 7:
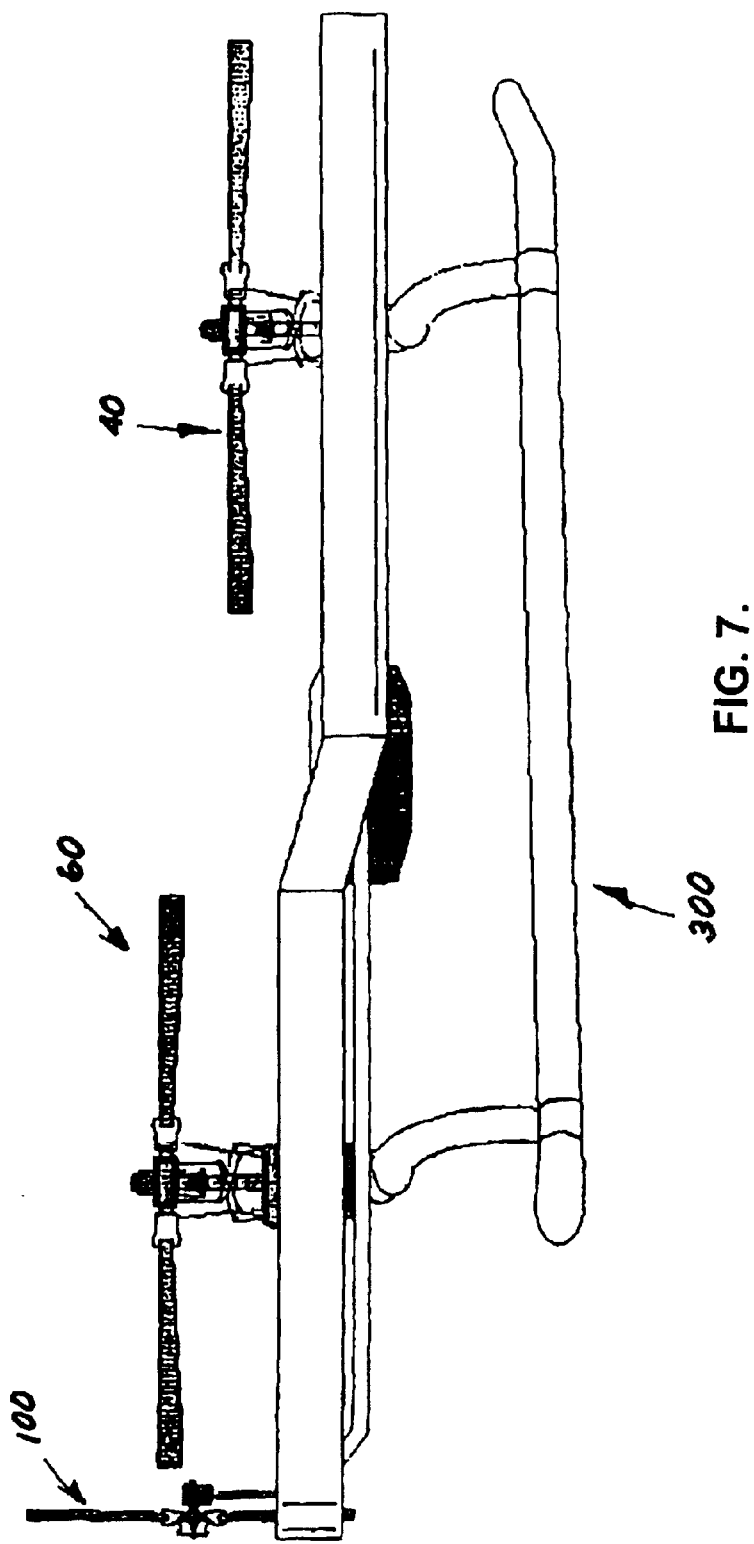
FIG. 7 is a side elevational view of an alternative form of the vehicle.

One form of the vehicle 10 includes landing skids 300 mounted on the bottom 28 of the vehicle 10 as shown in FIG. 7. The landing gear 300 should be mounted at the same point as the main rotor assemblies and should be centered and balanced so as not to affect the in-flight aerodynamics. The landing gear 300 is constructed of a light weight but durable material to withstand the stress of landing and should be designed to deflect in order to absorb the shock encountered when landing.

It is understood that while certain forms of the present invention have been illustrated and described herein, it is not to be limited to the specific forms or arrangements of parts described and shown.

What is claimed and desired to be covered by Letters Patent is:

1. A motor vehicle comprising:
   a) a main body that is in the shape of a land vehicle car and which has
      (1) a front end,
      (2) a rear end,
      (3) a longitudinal axis extending between the front end and the rear end,
      (4) a first side,
      (5) a second side,
      (6) a transverse axis extending between the first side and the second side,
      (7) a top,
      (8) a bottom,
      (9) a height dimension extending between the top and the bottom,
      (10) a front vent area located near the front end of said main body, and
      (11) a rear vent area located near the rear end of said main body;
   b) a front rotor mounted on said main body near the front end of said main body and oriented to rotate in a horizontal plane, said front rotor including at least one rotor blade that includes a longitudinal axis and is mounted to move in a roll motion about the longitudinal axis of the rotor blade of said front rotor;
   c) a rear rotor mounted on said main body near the rear end of said main body and oriented to rotate in a horizontal plane, said rear rotor including at least one rotor blade that includes a longitudinal axis and is mounted to move in a roll motion about the longitudinal axis of the rotor blade of said rear rotor;
   d) a power plant mounted on said main body between the front end of said main body and the rear end of said main body;
   e) a front rotor connection system coupling said power plant to said front rotor;
   f) a rear rotor connection system coupling said power plant to said rear rotor;
   g) a tail rotor mounted on the rear end of said main body and oriented to rotate in a vertical plane and to provide thrust propulsion to said main body in the direction of the longitudinal axis of said main body, said tail rotor having at least one rotor blade that includes a longitudinal axis and is mounted to rotate in a roll direction about the longitudinal axis of the rotor blade of said tail rotor to have a positive pitch, a negative pitch and a neutral pitch;
   h) a tail rotor connection system coupling said tail rotor to said power plant;
   i) a driver's seat mounted on said main body between said front rotor and said rear rotor;
   j) a passenger seat mounted on said main body adjacent to said driver's seat;
   k) a steering mechanism mounted on said main body and including
      (1) a compound steering wheel mounted on said main body adjacent to said driver's seat, said compound steering wheel including an outer steering wheel and an inner steering wheel, the outer steering wheel and the inner steering wheel being rotatable, and
      (2) a steering connection connecting the steering wheel to said tail rotor and connecting said outer steering wheel to said front rotor and connecting said inner steering wheel to said rear rotor,
      (3) the steering wheel being movably mounted on said main body to be movable in the direction of the longitudinal axis of said main body between a forward orientation and a rearward orientation;

l) a brake mechanism mounted on said main body in front of said driver's seat and including
   (1) a brake pedal located in front of said driver's seat, and
   (2) a brake connection connecting the brake pedal to the rotor blade of said tail rotor to move the rotor blade of said tail rotor in accordance with the position of the brake pedal between the positive pitch position, the negative pitch position and the neutral pitch position of the rotor blade of said tail rotor;
m) an accelerator mechanism mounted on said main body and including
   (1) an accelerator pedal mounted on said main body adjacent to said driver's seat, and
   (2) an accelerator mechanism connecting the accelerator pedal to the rotor blade of said tail rotor to vary the pitch of the rotor blade of said tail rotor between the positive pitch, the negative pitch and the neutral pitch in accordance with the position of the accelerator pedal, the accelerator pedal being further connected to said forward rotor and to said rear rotor.

* * * * *